(12) United States Patent
Zha et al.

(10) Patent No.: US 11,543,234 B2
(45) Date of Patent: Jan. 3, 2023

(54) MEASUREMENT METHOD FOR GEOMETRIC ERRORS OF NUMERICAL CONTROL TURNTABLE BASED ON FOUR-STATION LASER TRACER SYSTEM

(71) Applicant: XI'AN JIAOTONG UNIVERSITY, Xi'an (CN)

(72) Inventors: Jun Zha, Xi'an (CN); Yaolong Chen, Xi'an (CN); Lin Han, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 188 days.

(21) Appl. No.: 17/005,346

(22) Filed: Aug. 28, 2020

(65) Prior Publication Data
US 2021/0088322 A1    Mar. 25, 2021

(30) Foreign Application Priority Data
Aug. 30, 2019    (CN) .......................... 201910818811.5

(51) Int. Cl.
*G01B 9/02* (2022.01)
*G01B 11/00* (2006.01)

(52) U.S. Cl.
CPC ........ *G01B 9/02083* (2013.01); *G01B 11/005* (2013.01)

(58) Field of Classification Search
CPC .............. G01B 9/02083; G01B 11/005; G01B 5/0004; G01B 21/042; G01B 11/002;
(Continued)

(56) References Cited

FOREIGN PATENT DOCUMENTS

| CN | 103737426 A | * | 4/2014 | ........... B23Q 17/007 |
| CN | 105067011 A | * | 11/2015 | ............. G01C 25/00 |
| CN | 108007347 A | * | 5/2018 | ........... G01B 11/002 |

OTHER PUBLICATIONS

Encyclopedia of Mathematics, Cylinder coordinates, Feb. 7, 2011 (Year: 2011).*

(Continued)

*Primary Examiner* — Tarun Sinha
*Assistant Examiner* — Yossef Korang-Beheshti
(74) *Attorney, Agent, or Firm* — W&G Law Group

(57) ABSTRACT

A method for measuring geometric errors of a numerical control turntable based on a four-station laser tracer system includes: establishing a self-calibration coordinate system and calibrating positions of tracking interferometers; respectively placing each of target lenses at three non-coplanar points that are above the numerical control turntable and keep certain distances from the numerical control turntable, controlling the numerical control turntable to rotate at a certain angular interval $\theta_j$, and based on positions of the tracking interferometers being known after calibration, solving coordinates of each of measurement points in the self-calibration coordinate system using a non-linear least square method; establishing a turntable coordinate system; perform a conversion between the turntable coordinate system and the self-calibration coordinate system; separating six geometric errors of the numerical control turntable using spatial position errors of the three points at a same position and using the linear least squares method.

10 Claims, 2 Drawing Sheets

(58) Field of Classification Search
CPC .............. G01B 11/00; B23Q 2220/004; B23Q 17/2495; B23Q 17/24
See application file for complete search history.

(56) References Cited

OTHER PUBLICATIONS

Wolfram Mathworld, Cylindrical Coordinates, Mar. 3, 2016 (Year: 2016).*

* cited by examiner

MEASUREMENT METHOD FOR GEOMETRIC ERRORS OF NUMERICAL CONTROL TURNTABLE BASED ON FOUR-STATION LASER TRACER SYSTEM

CROSS-REFERENCE TO RELATED APPLICATIONS

The present application claims priority to Chinese Patent Application No. 2019108188115, filed on Aug. 30, 2019, the content of which is incorporated herein by reference in its entirety.

TECHNICAL FIELD

The present disclosure relates to the technical field of measuring geometric errors of numerical control turntables, and particularly, to a measurement method for a geometric errors of a numerical control turntable based on a four-station laser tracer system.

BACKGROUND

With the continuous development of modern manufacturing and national defense industry, precision and ultra-precision machining and manufacturing technology have increasing demands for high-end multi-axis numerical control machine tools with ultra-high-precision rotation axes, especially in the field of large-aperture optical free-form surface components required for national defense such as inertial confinement nuclear fusion, ground observation, lidar, EUV lithography. The geometric precision of the rotation axis directly affects key optical performance of large processed optical lenses, such as axis position, surface-shape accuracy, and surface roughness. In addition, it has more stringent requirements on the geometric precision and performance of the rotation axis of the numerical control machine tool when using off-axis to process large-aperture optical components.

Commonly used measurement methods of geometric errors of the rotation axis mainly include a laser interferometer measurement method and a ballbar measurement method. The laser interferometer measurement method is mostly used to measure positioning errors of a turntable, and it is difficult to adjust an optical path in the measurement process, and the adjustment is extremely dependent on operating skills of an operator. Thus, the laser interferometer measurement method has a relatively low measurement efficiency. The ballbar measurement method requires installation for many times to achieve separation of the geometric errors, and eccentricity needs to be adjusted in a test process, which takes a lot of time to adjust and has a relatively small test range and a relatively low measurement accuracy.

SUMMARY

The present disclosure provides a measurement method for geometric errors of a numerical control turntable based on a four-station laser tracer system, and it has fast detection speed and high accuracy and is suitable for high-end precision numerical control machine tools.

A measurement method for geometric errors of a numerical control turntable based on a four-station laser tracer system, including following steps:

S1: establishing a self-calibration coordinate system and calibrating positions of tracking interferometers;

S2: respectively placing each of target lenses at three non-coplanar points, each of the three non-coplanar points being located on or above the numerical control turntable, at least one of the three non-coplanar points located above the numerical control turntable keeping a certain distance from the numerical control turntable; controlling the numerical control turntable to rotate at a certain angular interval $\theta_j$; and based on positions of the tracking interferometers being known after calibration, solving coordinates of each of measurement points in the self-calibration coordinate system using a non-linear least square method;

S3: after measurement, taking three initial position points as theoretical points on the numerical control turntable, and perform fitting using the non-linear least square method to obtain a fitting function of a center $(x'_0, y'_0, z'_0)$ and a radius $R_C$ of a spatial circle formed by the three initial position points;

S4: establishing a turntable coordinate system;

S5: perform a conversion between the turntable coordinate system and the self-calibration coordinate system;

S6: subtracting coordinates $(x_j, y_j, z_j)$ of one of the theoretical points from actual coordinates $(x'_j, y'_j, z'_j)$ of one of the measurement points in the turntable coordinate system to obtain a spatial position error $(\Delta x_j, \Delta y_j, \Delta z_j)$ of the one of the measurement points, and through establishing a model of six position-related geometric errors of the numerical control turntable, separating six geometric errors of the numerical control turntable using spatial position errors of the three points at a same position and using the linear least squares method.

In an embodiment, in the step S1, the self-calibration coordinate system are established based on four-station laser tracer interferometers $LT_i(x_{pi}^L, y_{pi}^L, y_{pi}^L)$, i=1, 2, 3, 4; each of the target lenses $P_j(x_j^L, y_j^L, z_j^L)$, j=1, 2, 3 ... n is places at the three non-coplanar points located above the numerical control turntable that are away from the numerical control turntable at unequal heights; the numerical control turntable are rotated one revolution to form a cylindrical surface for measurement, light emitted by each of the four-station laser tracer interferometers is continuous during the measurement, a measured length between each of the target lenses and each of the four-station laser tracer interferometers read by the laser tracer interferometer and a formula of a distance between two points are used to form a non-linear equation set, and the non-linear equation set is solved to complete self-calibration of the laser tracer interferometer, and coordinate parameters of a position of the laser tracer interferometer is determined.

In an embodiment, the non-linear equation set formed by the measured length between the target lens and the laser tracer interferometer read by the laser tracer interferometer and the formula of the distance between two points is:

$$\begin{cases} \sqrt{(x_j^L - x_{p1}^L)^2 + (y_j^L - y_{p1}^L)^2 + (z_j^L - z_{p1}^L)^2} = l_1 + l_{1j} \\ \sqrt{(x_j^L - x_{p2}^L)^2 + (y_j^L - y_{p2}^L)^2 + (z_j^L - z_{p2}^L)^2} = l_2 + l_{2j} \\ \sqrt{(x_j^L - x_{p3}^L)^2 + (y_j^L - y_{p3}^L)^2 + (z_j^L - z_{p3}^L)^2} = l_3 + l_{3j} \\ \sqrt{(x_j^L - x_{p4}^L)^2 + (y_j^L - y_{p4}^L)^2 + (z_j^L - z_{p4}^L)^2} = l_4 + l_{4j}, \end{cases}$$

where $(x_j^L, y_j^L, z_j^L)$ represent coordinates of a $j^{th}$ measurement point, $(x_{pi}^L, y_{pi}^L, z_{pi}^L)$ represent coordinates of an $i^{th}$ laser tracer interferometer, $l_i$ represents a dead zone length and $l_{ij}$ represents a reading of a laser tracer interferometer.

In an embodiment, the self-calibration coordinate system has constraints:

$$x_{p1}^L=0; y_{p1}^L=0; z_{p1}^L=0; y_{p2}^L=0; z_{p2}^L=0; z_{p3}^L=0,$$

where $(x_{pi}^L, y_{pi}^L, z_{pi}^L)$ represent coordinates of an it laser tracer interferometer.

In an embodiment, when dead zone lengths of the four-station laser tracer interferometers uniquely determine coordinates of an unknown measurement point, a minimum number n of the measurement points required for the self-calibration is 9; when the dead zone lengths does not uniquely determine coordinates of an unknown measurement point, the minimum number n of the measurement points required for the self-calibration is 10.

In an embodiment, in the step 2, the coordinates of each of the measurement points in the self-calibration coordinate system is solves using the non-linear least square method:

$$\begin{cases} \sqrt{(x_j^L - x_{p1}^L)^2 + (y_j^L - y_{p1}^L)^2 + (z_j^L - z_{p1}^L)^2} = l_1 + l_{1j} \\ \sqrt{(x_j^L - x_{p2}^L)^2 + (y_j^L - y_{p2}^L)^2 + (z_j^L - z_{p2}^L)^2} = l_2 + l_{2j} \\ \sqrt{(x_j^L - x_{p3}^L)^2 + (y_j^L - y_{p3}^L)^2 + (z_j^L - z_{p3}^L)^2} = l_3 + l_{3j} \\ \sqrt{(x_j^L - x_{p4}^L)^2 + (y_j^L - y_{p4}^L)^2 + (z_j^L - z_{p4}^L)^2} = l_4 + l_{4j}, \end{cases}$$

where $(x_j^L, y_j^L, z_j^L)$ represent coordinates of an $j^{th}$ measurement point, $(x_{pi}^L, y_{pi}^L, z_{pi}^L)$ represent coordinates of an $i^{th}$ laser tracer interferometer, $l_i$ represents a dead zone length, and $l_{ij}$ represents a reading of a laser tracer interferometer.

In an embodiment, in the step 3, theoretical position coordinates of one of the measurement points obtained after the fitting are:

$$\begin{cases} x_j = R_C \cos \theta_j \\ y_j = R_C \sin \theta_j, \\ z_j = z_0 \end{cases}$$

where $R_C$ represents a radius, $\theta_j$ represents an angular interval when measuring turntable points, and $z_0$ is a distance from a center of a target lens to an end surface of the numerical control turntable.

In an embodiment, the fitting function J of the center $(x'_0, y'_0, z'_0)$ and the radius $R_C$ of the spatial circle formed by the three initial position points, $$J = \min \sum_{j=1}^{n} \left[ \sqrt{(x_j^L - x'_0)^2 + (y_j^L - y'_0)^2 + (z_j^L - z'_0)^2} - R_C \right]^2,$$

where $(x_j^L, y_j^L, z_j^L)$ represent coordinates of an $j^{th}$ measurement point.

In an embodiment, in the step 4, the circle center obtained after the fitting is taken as a circle center of the turntable coordinate system, a connecting line between one of the three initial position points and the circle center as an $X^L$ axis direction of the turntable coordinate system, a normal vector of a plane determined by the three initial position points is taken as a $Z^L$ direction of a C-axis turntable, and a $Y^L$ axis direction of the turntable coordinate system is determined based on a right-hand spiral rule of a Cartesian coordinate system.

In an embodiment, after the turntable coordinate system is established, the conversion between the self-calibration coordinate system and the turntable coordinate system is performed using a translation matrix transformation and a rotation matrix transformation, a coordinate transformation relationship is obtained, and actual coordinates $(x'_j, y'_j, z'_j)$ of the one of the measurement points in the turntable coordinate system are obtained by multiplying the coordinate transformation relationship by a homogeneous coordinate matrix of the one of the measurement points.

The measurement method for geometric errors of the numerical control turntable based on the four-station laser tracer system of the present disclosure, during the measurement, the four-station laser tracer interferometers are utilized to achieve quickly measurement of the geometric errors of the numerical control turntable, a self-calibration coordinate system of the laser tracer interferometers is established by using four-station laser tracer interferometers, the cylindrical surface formed by three points arranged at different heights is utilized to complete calibration of position parameters of the laser tracer interferometers, and the measurement of points is completed. The three non-coplanar points is measured by respectively rotating the turntable one revolution at a certain angular interval, the coordinates of the points are measured to establish the turntable coordinate system, and the coordinates of the measurement points in the turntable coordinate system are obtains according to translation and rotation matrixes change. The turntable radius obtained by fitting are utilized to calculate and obtain coordinates of theoretical points, and spatial position errors of the measurement points are solved. The numerical control model is utilized to separate six geometric errors of the turntable. This method has a fast measurement efficiency and a high measurement precision, and it is suitable for the geometric error measurement of a single numerical control turntable and a turntable located on a numerical control machine tool, does not depend on the machine tool coordinate system and has a wide range of applications. Compared with related methods, the measurement method involved in the present disclosure uses the four-station laser tracer interferometers to perform simultaneous measurement, to ensure relatively high measurement precision, thereby effectively reducing measurement uncertainty.

In an embodiment, the measurement based on the self-calibration coordinate system of the four-station laser tracer interferometer is free from limitation of the numerical control machine tool's own coordinate system, providing a wider application range.

In an embodiment, when using the four-stations to measure, the number n of measurement points is set to be greater than 16 such that an equation set can be solved. When solving in the self-calibration coordinate system, the number n of the measurement points can be greater than 10 for solving. When the dead zone length can uniquely determine coordinates of an unknown measurement point, the minimum value of the number n of the measurement points required for calibration is 9, which can speed up the measurement.

In an embodiment, since the four laser tracer interferometers perform measurement simultaneously in the measurement method involved in the present disclosure, the measurement for the geometric errors of a horizontal oil static pressure turntable takes 30 minutes.

In an embodiment, the coordinates of the laser tracer interferometers after the initial value calculation are the coordinates solved in the measurement coordinate system of the turntable, so this coordinate system needs to be converted into a measurement coordinate system of the laser tracer interferometer, in order to directly solve the errors of the turntable.

In an embodiment, the conversion between the coordinate systems can be realized by combining rotation matrix transformation of cosine values composed of direction vectors of the coordinate system of the laser tracer interferometers and direction vectors of the current coordinate system with the translation transformation matrix between two origins of two coordinate systems, and the coordinates of the stations and the measurement points in the coordinate system of the tracking interferometers can be obtained by multiplying the coordinate transformation matrix and the homogeneous coordinates of the stations and the measurement points in the turntable coordinate system.

In view of the above, the present disclosure takes less detection time, and has a high detection precision and low detection uncertainty, and the detection accuracy meets detection requirements for precise numerical control machine tools, so that it can be used for the turntable error detection of the precise numerical control machine tools.

The technical solutions of the present disclosure will be further described in detail below through the accompanying drawings and embodiments.

DESCRIPTION OF EMBODIMENTS

Figure 1:
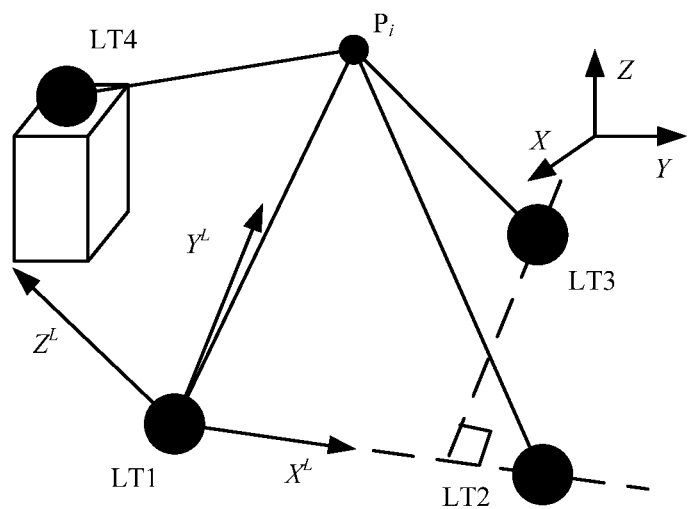
FIG. 1 is a schematic diagram of measurement of a laser tracer interferometer.

The present disclosure provides a measurement method for geometric errors of a numerical control turntable based on a four-station laser tracer system, a self-calibration coordinate system of the laser tracer interferometers are established using four-station laser tracer interferometers, calibration of position parameters of the laser tracer interferometers is performed using a cylindrical surface formed by three points located at different position with different heights, and a measurement for points is performed. A measurement for the three non-coplanar points is performed by respectively rotating the turntable one revolution at a certain angular interval. Measured coordinates of the points is used to establish a turntable coordinate system and obtains coordinates of the measurement points in the turntable coordinate system according to a translation matrix and a rotation matrix, coordinates of theoretical points are calculated using a turntable radius obtained by fitting, and spatial position errors of the measurement points are solved. Six geometric errors of the turntable is obtained using mathematical model decomposition. This method has a fast measurement efficiency and high measurement precision, and it is suitable for geometric errors of a single numerical control turntable and a turntable on a numerical control machine tool.

The present disclosure provides the measurement method for the geometric errors of the numerical control turntable based on a four-station laser tracer system, and it includes following steps.

At step S1, a self-calibration coordinate system is established and a calibration of positions of tracking interferometers is performed.

The self-calibration coordinate system is established using four-station laser tracer interferometers $LT_i(x_{pi}^L, y_{pi}^L, y_{pi}^L)$, i=1, 2, 3, 4. Each of the target lenses $P_i$ $(x_j^L, y_j^L, z_j^L)$, j=1, 2, 3 . . . n is places at three initial points of A, B and C which are at unequal heights above the turntable, the turntable is rotated one revolution to form a cylindrical surface for measurement, and it is ensured that light emitted by the laser tracer interferometer is continuous during the measurement, a measured length between the target lens and the laser tracer interferometer read by the laser tracer interferometer and a formula of a distance between two points are used to form a non-linear equation set, which is shown in a formula (1) and is solved such that the self-calibration of the laser tracer interferometer can be completed, that is, coordinate parameters of the position of the laser tracer interferometer is determined.

$$\begin{cases} \sqrt{(x_j^L - x_{p1}^L)^2 + (y_j^L - y_{p1}^L)^2 + (z_j^L - z_{p1}^L)^2} = l_1 + l_{1j} \\ \sqrt{(x_j^L - x_{p2}^L)^2 + (y_j^L - y_{p2}^L)^2 + (z_j^L - z_{p2}^L)^2} = l_2 + l_{2j} \\ \sqrt{(x_j^L - x_{p3}^L)^2 + (y_j^L - y_{p3}^L)^2 + (z_j^L - z_{p3}^L)^2} = l_3 + l_{3j} \\ \sqrt{(x_j^L - x_{p4}^L)^2 + (y_j^L - y_{p4}^L)^2 + (z_j^L - z_{p4}^L)^2} = l_4 + l_{4j}, \end{cases} \quad (1)$$

where $(x_j^L, y_j^L, z_j^L)$ represent coordinates of a $j^{th}$ measurement point, $(x_{pi}^L, y_{pi}^L, z_{pi}^L)$ represent coordinates of an $i^{th}$ laser tracer interferometer, $l_i$ represents a dead zone length, and $l_{ij}$ represents a reading of the laser tracer interferometer.

A first laser tracer interferometer LT1 is disposed at an origin O of the self-calibration coordinate system, a second laser tracer interferometer LT2 is disposed in an X axis direction of the self-calibration coordinate system, a third laser tracer interferometer LT3 is disposed in an XY plane of the coordinate system, and a fourth laser tracer interferometer LT4 is not coplanar with any one of LT1, LT2 and LT3, such that the self-calibration coordinate system can be established, that is, there are constraints as follows:

$$x_{p1}^L=0; y_{p1}^L=0; z_{p1}^L=0; y_{p2}^L=0; z_{p2}^L=0; z_{p3}^L=0 \quad (5).$$

When the dead zone lengths of the four-station laser tracer interferometers can uniquely determine coordinates of an unknown measurement point, the minimum number n of the measurement points required for the calibration is 9. When the dead zone lengths cannot uniquely determine coordinates of an unknown measurement point, the minimum number n of the measurement points required for the calibration is 10.

At step S2, The target lens is placed at three non-coplanar points, each of the three non-coplanar points is located on or above the turntable, at least one of the three non-coplanar points located above the numerical control turntable keeps a certain distance away from the turntable, the turntable is controlled to be rotated at a certain angular interval it is ensured that there is continuous light between the laser tracer interferometer and the target lens during the measurement, and is used, coordinates of the measurement points in the self-calibration coordinate system can be solved utilizing the positions of the tracking interferometers being unknown after calibration and using a non-linear least square method, the solution formulas being as follows:

$$\begin{cases} \sqrt{(x_j^L - x_{p1}^L)^2 + (y_j^L - y_{p1}^L)^2 + (z_j^L - z_{p1}^L)^2} = l_1 + l_{1j} \\ \sqrt{(x_j^L - x_{p2}^L)^2 + (y_j^L - y_{p2}^L)^2 + (z_j^L - z_{p2}^L)^2} = l_2 + l_{2j} \\ \sqrt{(x_j^L - x_{p3}^L)^2 + (y_j^L - y_{p3}^L)^2 + (z_j^L - z_{p3}^L)^2} = l_3 + l_{3j} \\ \sqrt{(x_j^L - x_{p4}^L)^2 + (y_j^L - y_{p4}^L)^2 + (z_j^L - z_{p4}^L)^2} = l_4 + l_{4j}. \end{cases} \quad (2)$$

At step S3, after the measurement is completed, the three initial position points Q, M and K are taken as theoretical points on the turntable, and a fitting function of a circle center $(x'_0, y'_0, z'_0)$ and a radius $R_C$ of a spatial circle formed by the three points can be obtained by fitting and using the non-linear least square method, and the fitting function is:

$$J = \min \sum_{j=1}^{n} \left[ \sqrt{(x_j^L - x'_0)^2 + (y_j^L - y'_0)^2 + (z_j^L - z'_0)^2} - R_C \right]^2. \quad (3)$$

Theoretical position coordinates of the measurement points obtained with the fitting are:

$$\begin{cases} x_j = R_C \cos \theta_j \\ y_j = R_C \sin \theta_j \\ z_j = z_0 \end{cases} \quad (4)$$

At step S4, the turntable coordinate system is established.

The circle center obtained by fitting is taken as a circle center of the turntable coordinate system, a connecting line between the circle center and the point Q of the initially measured three points is taken as an $X^L$ axis direction of the turntable coordinate system, a normal vector of a plane determined by the three points Q, M and K is taken as a $Z^L$ direction of a C-axis turntable, and a $Y^L$ axis direction of the turntable coordinate system is determined according to the right-hand spiral rule of the Cartesian coordinate system.

At step S5, a conversion between the turntable coordinate system and the self-calibration coordinate system is performed.

After the coordinate system is established, the conversion between the self-calibration coordinate system and the turntable coordinate system is realized using a translation transformation matrix and a rotation transformation matrix, and the transformation matrixes can be easily obtained by calculation according to transformation relationship between the two coordinate systems. Actual coordinates $(x'_j, y'_j, z'_j)$ of the measurement point in the turntable coordinate system can be obtained by multiplying this coordinate transformation relationship with a homogeneous coordinate matrix of the measurement point.

At step S6, the theoretical point coordinates $(x_j, y_j, z_j)$ are subtracted from the actual coordinates $(x'_j, y'_j, z'_j)$ of the measurement point in the turntable coordinate system to obtain spatial position errors $(\Delta x_j, \Delta y_j, \Delta z_j)$ of the measurement point, and through establishing a model of six position-related geometric errors of the turntable, the six geometric errors of the turntable can be obtained by separation using the spatial position errors of three points at the same position and using the linear least squares method.

To make technical solutions of the embodiments of the present disclosure clearer, the technical solutions in the embodiments of the present disclosure will be described clearly and completely in conjunction with the drawings in the embodiments of the present disclosure. Obviously, the described embodiments are part of the embodiments of the present disclosure, but not all the embodiments. Generally, the illustration and components of the embodiments of the present disclosure described and illustrated in the drawings herein can be arranged and designed in a variety of different configurations. Therefore, the following detailed description of the embodiments of the present disclosure provided in the drawings is not intended to limit the scope of the present disclosure, but merely represents selected embodiments of the present disclosure. Based on the embodiments of the present disclosure, all other embodiments obtained by a person of ordinary skill in the art without making creative efforts fall into the protection scope of the present disclosure.

The present disclosure provides the measurement method for the geometric errors of the numerical control turntable based on the four-station laser tracer system, and it includes two parts, i.e., a measurement scheme and a measurement data processing scheme.

1. The Measurement Scheme

Figure 2:
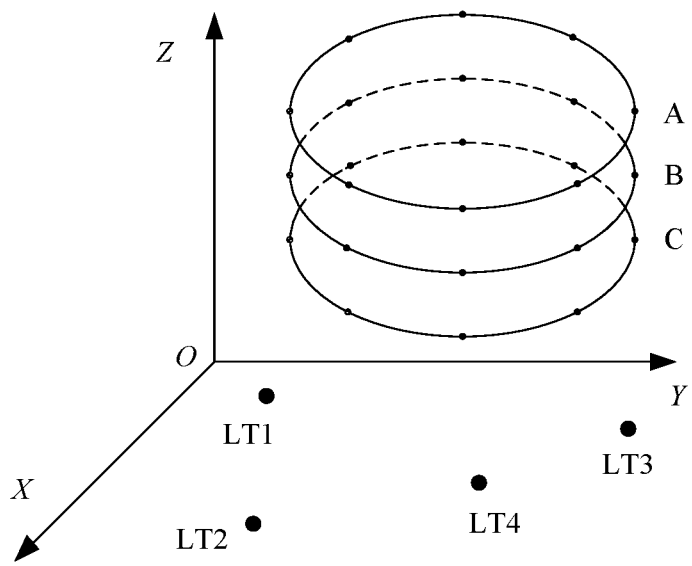
FIG. 2 is a schematic diagram illustrating that a laser tracer interferometer performs a three-point self-calibration using initial three points A, B, and C.

1) During the measurement, as shown in FIG. 1, a self-calibration coordinate system of the laser tracer interferometer is established, and position coordinate parameters of the laser tracer interferometers are calibrated using spatial points. As shown in FIG. 2, the target lens are placed at three points A, B, and C which are at unequal heights from an end surface of the turntable, the turntable is controlled in turn to be rotated one revolution, to complete the self-calibration, and it is ensured that light is continuous between the laser tracer interferometer and the target lens during switching of the initial positions.

Figure 3:
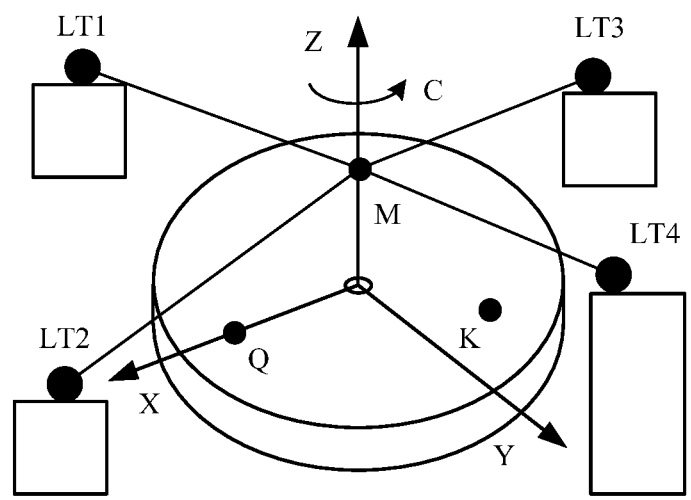
FIG. 3 is a schematic diagram of an arrangement used for measuring initial three points Q, M and K by a laser tracer interferometer.

2) As shown in FIG. 3, the target lens is placed at three different positions Q, M and K which are at a certain height from the turntable, and the turntable is controlled in turn to be rotated at an interval of a certain angle $\theta_j$. The turntable is kept a position for a long enough time period, in such a manner that the laser tracer interferometer effectively collects a distance from the target lens, and when changing the position of the target lens, light is continuous between the laser tracer interferometer and the target lens.

2. The Measurement Data Processing Scheme

A. Self-calibration of the position parameters of the laser tracer interferometers and determination of the coordinates of the measurement points 3) in the self-calibration coordinate system, points A, B and C that are at unequal heights from the end surface of the turntable are utilized, and in the process of rotating the turntable one revolution, the distance measurement of the target lens is performed at the same interval each time, and the display readings $l_{ij}$ of the distances between the target lens and the four laser tracer interferometers located at respective corner are recorded. The coordinates of the $j^{th}$ measurement point are $(x_j^L, y_j^L, z_j^L)$, i=1, 2 ... n, and the coordinates of an $i^{th}$ turret are $(x_{pi}^L, y_{pi}^L, y_{pi}^L)$. According to the formula of the distance between two points in space in conjunction with the dead zone length $l_j$ during the measurement process, it is obtained that $$x_{p1}^L = 0; y_{p1}^L = 0; z_{p1}^L = 0; y_{p2}^L = 0; z_{p2}^L = 0; z_{p3}^L = 0 \quad (6).$$

5) According to the distance equation (6) obtained from step 3), the function is optimally solved according to the non-linear least square method, to obtain position coordinates $(x_{pi}^L, y_{pi}^L, y_{pi}^L)$ of the four turrets. In the solving process, following constraints in the self-calibration coordinate system can be taken into account:

$$x_{p1}^L=0; y_{p1}^L=0; z_{p1}^L=0; y_{p2}^L=0; z_{p2}^L=0; z_{p3}^L=0 \quad (7).$$

6) In the self-calibration coordinate system, utilizing the initially measurement points Q, M and K, the turntable is rotated one revolution at a certain angular interval, and the displayed distance reading $l_{ij}$ between the target lens and the laser tracer interferometer is measured and recorded by the laser tracer interferometer. The coordinates of the $j^{th}$ measurement point are $(x_j^L, y_j^L, z_j^L)$, i=1, 2 . . . n. The coordinates of the $i^{th}$ turret are $(x_{pi}^L, y_{pi}^L, y_{pi}^L)$. According to the formula of the distance between two points in space in conjunction with the dead zone length $l_j$ during the measurement process, then measurement equations of the four-station laser tracer interferometers for the point j is:

$$\begin{cases} \sqrt{x_j^2 + y_j^2 + z_j^2} = l_1 + l_{1j} \\ \sqrt{(x_j - x_{p2})^2 + y_j^2 + z_j^2} = l_2 + l_{2j} \\ \sqrt{(x_j - x_{p3})^2 + (y_j - y_{p3})^2 + z_j^2} = l_3 + l_{3j} \\ \sqrt{(x_j - x_{p4})^2 + (y_j - y_{p4})^2 + (z_j - z_{p4})^2} = l_4 + l_{4j} \end{cases} \quad (8)$$

7) According to the distance equation (8) obtained from step 6), the function is optimally solved according to the non-linear least square method, to obtain the coordinates $(x_j^L, y_j^L, z_j^L)$ of the measurement point, and the laser tracer interferometer position $(x_{pi}^L, y_{pi}^L, y_{pi}^L)$ is known.

B. Method of Conversion Between the Self-Calibration Coordinate System and the Turntable Coordinate System 8) According to the initial points Q, M and K, the turntable is controlled to be rotated one revolution at a certain fixed angular interval, and after calculating its coordinates, it is assumed that the three points Q, M, and K at the initial points have no geometric errors and are ideal coordinate points on the turntable. Taking the normal vector of the plane determined by these three points as the Z direction of the C-axis turntable, the circle center of the spatial circle obtained by fitting these three points is taken as the origin of the turntable coordinate system, the direction of the connecting line between the point Q and the circle center is taken as the X axis direction, and the Y-axis direction is determined according to the right-hand Cartesian coordinate system. An function obtained by solving the spatial circle obtained by fitting the three points is:

$$J = \min\sum_{j=1}^{n} \left[ \sqrt{(x_j^L - x_0')^2 + (y_j^L - y_0')^2 + (z_j^L - z_0')^2} - R_C \right]^2. \quad (9)$$

The solved $R_C$ is taken as a theoretically measured radius of the turntable, and according to an angle $\theta_j$ rotated to the measurement point, the theoretical point $(x_j, y_j, z_j)$ of the measurement point on the turntable is calculated according to formulas (10).

$$\begin{cases} x_j = R_C \cos\theta_j \\ y_j = R_C \sin\theta_j \\ z_j = z_0 \end{cases} \quad (10)$$

9) According to relative positional relationship between the turntable coordinate system and the self-calibration coordinate system, the conversion relationship between the two coordinate systems can be obtained using the translation and rotation matrix transformations, and actual coordinates of the measurement point in the turntable coordinate system can be calculated by multiplying the homogeneous coordinates of the measurement point in the self-calibration coordinate system and the coordinate system transformation matrix. The actual coordinates of the measurement point after calculation are $(x'_j, y'_j, z'_j)$.

C. Separation Algorithm of Errors of the Turntable

10) Utilizing the coordinates of the theoretically measurement point calculated from step 8) and the actually measurement point obtained from step 9), the spatial position errors of the measurement point are obtained:

$$\begin{bmatrix} \Delta x_j \\ \Delta y_j \\ \Delta z_j \end{bmatrix} = \begin{bmatrix} x_j - x'_j \\ y_j - y'_j \\ z_j - z'_j \end{bmatrix}. \quad (11)$$

The relationship between the geometric errors of the turntable and the spatial position error is established using a certain mathematical model, and according to the spatial position errors of the measurement points at positions corresponding to the rotation angles corresponding to the initial Q, M and K, six geometric errors at respective angular positions of the turntable can be solved according to the linear least square method.

This measurement takes 30 minutes, the six errors of the turntable can be obtained by substituting test data into a calculation program written by MTALAB, and a detection efficiency is extremely high, so that the measurement efficiency of the geometric errors of the numerical control turntable is greatly improved under the premise of ensuring the measurement accuracy, which indicates that the turntable detection method of the present disclosure has broad engineering application prospects and practical application value.

When the measurement is performed using the four-station laser tracer interferometers, only length data is used, which avoids using angle data and thus improves the measurement accuracy, and rapid measurement of the geometric errors of the turntable can be achieved through a single-time installation.

In view of the problem that the measurement method in related art cannot meet requirements for rapid and high-precision detection of the turntable, the present disclosure uses the four-station laser tracer interferometers to achieve quickly measurement of the geometric errors of the numerical control turntable, and during the measurement, a self-calibration coordinate system of the laser tracer interferometers is established by using four-station laser tracer interferometers, the cylindrical surface formed by three points arranged at different heights is utilized to complete calibration of position parameters of the laser tracer interferometers, and the measurement of points is completed. The three non-coplanar points is measured by respectively rotating the turntable one revolution at a certain angular interval, the coordinates of the points are measured to establish the turntable coordinate system, and the coordinates of the measurement points in the turntable coordinate system are obtains according to translation and rotation matrixes change. The turntable radius obtained by fitting are utilized to calculate and obtain coordinates of theoretical points, and spatial position errors of the measurement points are solved. The numerical control model is utilized to separate six geometric errors of the turntable. This method has a fast measurement efficiency and a high measurement precision, and it is suitable for the geometric error measurement of a single numerical control turntable and a turntable located on a numerical control machine tool, does not depend on the machine tool coordinate system and has a wide range of applications.

The above content is only for explaining the technical concept of the present disclosure and does not limit the protection scope of the present disclosure. Any modification made on the basis of the technical solution according to the technical concept proposed by the present disclosure shall fall into the protection scope of the claims of the present disclosure.

What is claimed is:

1. A measurement method for geometric errors of a numerical control turntable based on a four-station laser tracer system, comprising steps of:

S1: establishing a self-calibration coordinate system and calibrating positions of tracking interferometers;

S2: respectively placing each of target lenses at three non-coplanar points, each of the three non-coplanar points being located on or above the numerical control turntable, at least one of the three non-coplanar points located above the numerical control turntable keeping a certain distance from the numerical control turntable; controlling the numerical control turntable to rotate at a certain angular interval $\theta_j$; and based on positions of the tracking interferometers being known after calibration, solving coordinates of each of measurement points in the self-calibration coordinate system using a non-linear least square method;

S3: after measurement, taking three initial position points as theoretical points on the numerical control turntable, and perform fitting using the non-linear least square method to obtain a fitting function of a center $(x'_0, y'_0, z'_0)$ and a radius $R_C$ of a spatial circle formed by the three initial position points;

S4: establishing a turntable coordinate system;

S5: perform a conversion between the turntable coordinate system and the self-calibration coordinate system;

S6: subtracting coordinates $(x_j, y_j, z_j)$ of one of the theoretical points in the turntable coordinate system from actual coordinates $(x'_j, y'_j, z'_j)$ of one of the measurement points in the self-calibration coordinate system to obtain a spatial position error $(\Delta x_j, \Delta y_j, \Delta z_j)$ of the one of the measurement points, and through establishing a model of six position-related geometric errors of the numerical control turntable, separating six geometric errors of the numerical control turntable using spatial position errors of the three initial position points at a same position and using the linear least squares method.

2. The measurement method for the geometric errors of the numerical control turntable based on the four-station laser tracer system according to claim 1, wherein in the step S1, the self-calibration coordinate system are established based on four-station laser tracer interferometers $LT_{it}(x_{pi}^L, y_{pi}^L, z_{pi}^L)$, i=1, 2, 3, 4, in the turntable coordinate system; each of the target lenses $P_i(x_j^L, y_j^L, z_j^L)$, j=1, 2, 3 ... n in the turntable coordinate system is places at the three non-coplanar points located above the numerical control turntable that are away from the numerical control turntable at unequal heights; the numerical control turntable are rotated one revolution to form a cylindrical surface for measurement, light emitted by each of the four-station laser tracer interferometers is continuous during the measurement, a measured length between each of the target lenses and each of the four-station laser tracer interferometers read by the laser tracer interferometer and a formula of a distance between two points are used to form a non-linear equation set, and the non-linear equation set is solved to complete self-calibration of the laser tracer interferometer, and coordinates of a position of the laser tracer interferometer is determined.

3. The measurement method for the geometric errors of the numerical control turntable based on the four-station laser tracer system according to claim 2, wherein the non-linear equation set formed by the measured length between the target lens and the laser tracer interferometer read by the laser tracer interferometer and the formula of the distance between two points is:

$$\begin{cases} \sqrt{(x_j^L - x_{p1}^L)^2 + (y_j^L - y_{p1}^L)^2 + (z_j^L - z_{p1}^L)^2} = l_1 + l_{1j} \\ \sqrt{(x_j^L - x_{p2}^L)^2 + (y_j^L - y_{p2}^L)^2 + (z_j^L - z_{p2}^L)^2} = l_2 + l_{2j} \\ \sqrt{(x_j^L - x_{p3}^L)^2 + (y_j^L - y_{p3}^L)^2 + (z_j^L - z_{p3}^L)^2} = l_3 + l_{3j} \\ \sqrt{(x_j^L - x_{p4}^L)^2 + (y_j^L - y_{p4}^L)^2 + (z_j^L - z_{p4}^L)^2} = l_4 + l_{4j}, \end{cases}$$

where $(x_j^L, y_j^L, z_j^L)$ represent coordinates of a $j^{th}$ measurement point in the turntable coordinate system, $(x_{pi}^L, y_{pi}^L, z_{pi}^L)$ represent coordinates of an $i^{th}$ laser tracer interferometer in the turntable coordinate system, $l_i$ represents a dead zone length and $l_{ij}$ represents a reading of a laser tracer interferometer.

4. The measurement method for the geometric errors of the numerical control turntable based on the four-station laser tracer system according to claim 2, wherein the self-calibration coordinate system has constraint conditions:

$$x_{p1}^L=0; y_{p1}^L=0; z_{p1}^L=0; y_{p2}^L=0; z_{p2}^L=0; z_{p3}^L=0,$$

where $(x_{pi}^L, y_{pi}^L, z_{pi}^L)$ represent coordinates of an $i^t$ laser tracer interferometer in the turntable coordinate system.

5. The measurement method for the geometric errors of the numerical control turntable based on the four-station laser tracer system according to claim 4, wherein when dead zone lengths of the four-station laser tracer interferometers uniquely determine coordinates of an unknown measurement point, a minimum number n of the measurement points required for the self-calibration is 9; when the dead zone lengths does not uniquely determine coordinates of an unknown measurement point, the minimum number n of the measurement points required for the self-calibration is 10.

6. The measurement method for the geometric errors of the numerical control turntable based on the four-station laser tracer system according to claim 1, wherein in the step S2, the coordinates of each of the measurement points in the self-calibration coordinate system is solves using the non-linear least square method:

$$\begin{cases} \sqrt{(x_j^L - x_{p1}^L)^2 + (y_j^L - y_{p1}^L)^2 + (z_j^L - z_{p1}^L)^2} = l_1 + l_{1j} \\ \sqrt{(x_j^L - x_{p2}^L)^2 + (y_j^L - y_{p2}^L)^2 + (z_j^L - z_{p2}^L)^2} = l_2 + l_{2j} \\ \sqrt{(x_j^L - x_{p3}^L)^2 + (y_j^L - y_{p3}^L)^2 + (z_j^L - z_{p3}^L)^2} = l_3 + l_{3j} \\ \sqrt{(x_j^L - x_{p4}^L)^2 + (y_j^L - y_{p4}^L)^2 + (z_j^L - z_{p4}^L)^2} = l_4 + l_{4j} \end{cases}$$

where $(x_j^L, y_j^L, z_j^L)$ represent coordinates of an $j^{th}$ measurement point in the turntable coordinate system, $(x_{pi}^L, y_{pi}^L, z_{pi}^L)$ represent coordinates of an $i^{th}$ laser tracer interferometer in the turntable coordinate system, $l_i$ represents a dead zone length, and $l_{ij}$ represents a reading of a laser tracer interferometer.

7. The measurement method for the geometric errors of the numerical control turntable based on the four-station laser tracer system according to claim 1, wherein in the step S3, theoretical position coordinates of one of the measurement points obtained after the fitting are:

$$\begin{cases} x_j = R_C \cos \theta_j \\ y_j = R_C \sin \theta_j \\ z_j = z_0 \end{cases}$$

where $R_C$ represents a radius, $\theta_j$ represents an angular interval when measuring turntable points, and $z_0$ is a distance from a center of a $j^{th}$ target lens to an end surface of the numerical control turntable, where j=1, 2, 3 . . . n.

8. The measurement method for the geometric errors of the numerical control turntable based on the four-station laser tracer system according to claim 7, wherein the fitting function J of the center $(x'_0, y'_0, z'_0)$ in the self-calibration coordinate system and the radius $R_C$ of the spatial circle formed by the three initial position points, $$J = \min \sum_{j=1}^{n} \left[ \sqrt{(x_j^L - x'_0)^2 + (y_j^L - y'_0)^2 + (z_j^L - z'_0)^2} - R_C \right]^2,$$

where $(x_j^L, y_j^L, z_j^L)$ represent coordinates of an $j^{th}$ measurement point in the turntable coordinate system.

9. The measurement method for the geometric errors of the numerical control turntable based on the four-station laser tracer system according to claim 1, wherein in the step S4, the circle center obtained after the fitting is taken as a circle center of the turntable coordinate system, a connecting line between one of the three initial position points and the circle center as an $X^L$ axis direction of the turntable coordinate system, a normal vector of a plane determined by the three initial position points is taken as a $Z^L$ direction of the turntable coordinate system, and a $Y^L$ axis direction of the turntable coordinate system is determined based on a right-hand spiral rule of a Cartesian coordinate system.

10. The measurement method for the geometric errors of the numerical control turntable based on the four-station laser tracer system according to claim 1, wherein in the step S5, after the turntable coordinate system is established, the conversion between the self-calibration coordinate system and the turntable coordinate system is performed using a translation matrix transformation and a rotation matrix transformation, a coordinate transformation relationship is obtained, and actual coordinates $(x'_j, y'_j, z'_j)$ in the self-calibration coordinate system of the one of the measurement points in the turntable coordinate system are obtained by multiplying the coordinate transformation relationship by a homogeneous coordinate matrix of the one of the measurement points.

* * * * *